United States Patent
Roberts

(10) Patent No.: US 10,187,937 B2
(45) Date of Patent: Jan. 22, 2019

(54) POWER FACTOR CORRECTION OPTIMIZATION BY DIGITAL FEEDBACK

(71) Applicant: GENERAL ELECTRIC COMPANY, Schenectady, NY (US)

(72) Inventor: Bruce Richard Roberts, Mentor-on-the-Lake, OH (US)

(73) Assignee: GENERAL ELECTRIC COMPANY, Shenectady, NY (US)

( * ) Notice: Subject to any disclaimer, the term of this patent is extended or adjusted under 35 U.S.C. 154(b) by 0 days.

(21) Appl. No.: 15/354,222

(22) Filed: Nov. 17, 2016

(65) Prior Publication Data

US 2018/0139810 A1    May 17, 2018

(51) Int. Cl.
*H05B 37/02* (2006.01)
*H05B 33/08* (2006.01)

(52) U.S. Cl.
CPC ..... *H05B 33/0815* (2013.01); *H05B 33/0809* (2013.01); *H05B 33/0845* (2013.01)

(58) Field of Classification Search
CPC ............ H05B 33/0809; H05B 33/0815; H05B 33/0845
USPC ................................. 315/192, 193
See application file for complete search history.

(56) References Cited

U.S. PATENT DOCUMENTS

| | | | |
|---|---|---|---|
| 7,843,150 B2* | 11/2010 | Wang | H05B 33/0815 315/185 R |
| 8,531,136 B2 | 9/2013 | Grajcar | |
| 9,301,356 B2 | 3/2016 | Hattrup et al. | |
| 9,516,718 B2* | 12/2016 | Jung | H05B 33/0812 |
| 2009/0128045 A1* | 5/2009 | Szczeszynski | H05B 33/0815 315/185 R |
| 2011/0273102 A1* | 11/2011 | van de Ven et al. | H05B 33/0809 315/193 |
| 2012/0081009 A1* | 4/2012 | Shteynberg | H05B 33/083 315/122 |
| 2014/0184080 A1* | 7/2014 | Rybicki | H05B 33/0845 315/122 |
| 2014/0375224 A1* | 12/2014 | Jung | H05B 33/083 315/193 |
| 2015/0341997 A1* | 11/2015 | Yoo | H05B 33/0827 315/191 |

FOREIGN PATENT DOCUMENTS

CN    203225926 U    10/2013
WO    2011096680 A2    8/2011

* cited by examiner

*Primary Examiner* — Tung X Le
(74) *Attorney, Agent, or Firm* — Peter T. DiMauro; GE Global Patent Operation

(57) ABSTRACT

A method of operating an LED lighting device includes sampling a voltage of a rectified AC waveform used to provide power to the LED lighting device, selectively connecting one or more of a plurality of LED light sources in a one or more of a series and parallel combination to achieve a predetermined voltage across the connected LED light sources with respect to the sampled voltage, and regulating a current through the connected LED light sources to achieve a predetermined current with respect to the sampled voltage.

5 Claims, 7 Drawing Sheets

POWER FACTOR CORRECTION OPTIMIZATION BY DIGITAL FEEDBACK

FIELD

The disclosed exemplary embodiments relate generally to lighting systems, and more particularly to light emitting diode (LED) lighting systems.

BACKGROUND

LED lighting technology continues to advance resulting in improved efficiencies and lower costs. LED light sources are found in lighting applications ranging from small pin point sources to stadium lights. Low cost, good color rendition and high efficiency are factors driving the LED lamp market for general lighting. The use of a rectified line driver to power an LED lighting application allows for a small size and low cost power supply, however, due to the design of this type of supply, providing a high power factor generally results in low efficiency and vice versa. Furthermore, most supplies have fixed operating parameters. It would be advantageous to provide an LED lighting device that overcomes these and other problems.

SUMMARY

As described herein, the exemplary embodiments overcome one or more of the above or other disadvantages known in the art.

The aspects of the disclosed embodiments are directed to a method of operating an LED lighting device including sampling a voltage of a rectified AC waveform used to provide power to the LED lighting device, selectively connecting one or more of a plurality of LED light sources in a one or more of a series and parallel combination to achieve a predetermined voltage across the connected LED light sources with respect to the sampled voltage, and regulating a current through the connected LED light sources to achieve a predetermined current with respect to the sampled voltage.

The method may include selectively connecting the one or more of a plurality of LED light sources in one or more of a series and parallel combination to achieve a predetermined efficiency as a ratio of the voltage across the connected LED light sources and the sampled voltage.

The method may also include regulating the current through the connected LED light sources to achieve a predetermined power factor as a ratio of the current through the connected LED light sources and the sampled voltage.

The method may further include connecting the one or more of the plurality of LED light sources in a first series and parallel combination while the sampled voltage remains within a first voltage range, and connecting the one or more of the plurality of LED light sources in a second series and parallel combination while the sampled voltage remains within a second voltage range.

The method may still further include identifying at least one of a plurality of voltage ranges into which the sampled voltage falls and connecting the one or more of the a plurality of LED light sources in a particular series and parallel combination while the sampled voltage remains within the identified voltage range.

The plurality of voltage ranges may include 0%-33%, 34%-50%, 51%-67%, 68%-84%, and 85%-100% of a peak voltage of the rectified AC waveform.

The aspects of the disclosed embodiments are also directed to an LED lighting device including a plurality of switches configured to selectively connect one or more of a plurality of LED light sources in one or more of a series and parallel combination, a linear regulator configured to control a current through the connected LED light sources, and a controller configured to sample a voltage of a rectified AC waveform used to provide power to the LED lighting device, control the plurality of switches to achieve a predetermined voltage across the connected LED light sources with respect to the sampled voltage, and control the linear regulator to achieve a predetermined current through the connected LED light sources with respect to the sampled voltage.

The controller may be configured to control the plurality of switches to selectively connect the one or more of a plurality of LED light sources in one or more of a series and parallel combination to achieve a predetermined efficiency as a ratio of the voltage across the connected LED light sources and the sampled voltage.

The controller may also be configured to control the linear regulator to achieve a predetermined power factor as a ratio of the current through the connected LED light sources and the sampled voltage.

The controller may further be configured to control the plurality of switches to connect the one or more of the plurality of LED light sources in a first series and parallel combination while the sampled voltage remains within a first voltage range, and to connect the one or more of the plurality of LED light sources in a second series and parallel combination while the sampled voltage remains within a second voltage range.

The controller may still further be configured to identify at least one of a plurality of voltage ranges into which the sampled voltage falls, and control the plurality of switches to connect the one or more of the plurality of LED light sources in a particular series and parallel combination while the sampled voltage remains within the identified voltage range.

The plurality of voltage ranges may include approximately 0%-33%, 34%-50%, 51%-67%, 68%-84%, and 85%-100% of a peak voltage of the rectified AC waveform.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION

Figure 1:
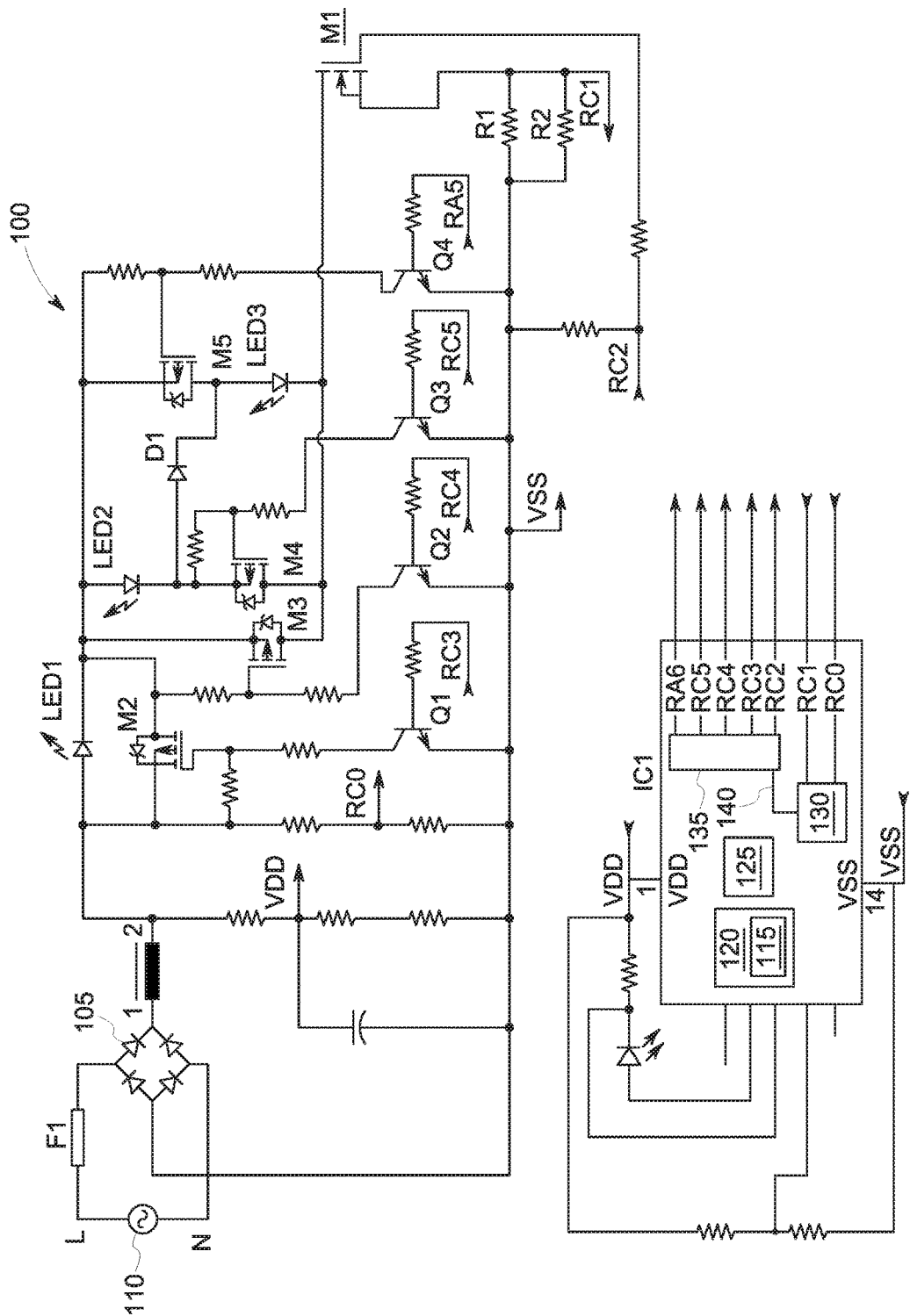
FIG. 1 shows an exemplary circuit 100 according to the disclosed embodiments.

FIG. 1 shows an exemplary circuit 100 according to the disclosed embodiments. The circuit 100 at least includes a rectifier 105, LED light sources LED1, LED2, and LED3, a diode D1, control switches Q1-Q4, current switches M1-M5, current sense resistors R1 and R2, and a microcontroller IC1.

The circuit 100 operates to sample a voltage from the rectifier 105 and selectively connecting one or more of the LED light sources LED1, LED2, and LED3 in a one or more of a series and parallel combination to achieve a predetermined voltage across the connected LED light sources with respect to the sampled voltage. The circuit 100 also operates to regulate a current through the connected LED light sources to achieve a predetermined current with respect to the sampled voltage.

Selectively connecting the LED light sources LED1, LED2, and LED3 in different series and parallel combinations may achieve a predetermined efficiency as a ratio of the voltage across the connected LED light sources and the sampled voltage, and regulating the current through the connected LED light sources may achieve a predetermined power factor as a ratio of the current through the connected LED light sources and the sampled voltage. The current through the circuit 100 may be controlled to be, for example, a sine wave, square wave or other shaped current, may be controlled to match a voltage from the rectifier 105 within a certain range, or may be controlled to have any other suitable characteristics. In at least one embodiment, the current through the circuit 100 may be controlled to provide a particular power factor.

The rectifier 105 may be used to rectify power from an AC mains supply 110 and may be a half wave or full wave bridge rectifier with an output that extends from 0v to approximately 1V below the peak output voltage of the AC mains supply. While a full wave bridge rectifier is shown, the disclosed embodiments may utilize any suitable rectification circuitry.

The LED light sources LED1, LED2, LED3 may include one or more LED chips or packaged LED's connected in various configurations to achieve a particular voltage rating and optionally one or more of a color temperature, color rendering index, lumen output, beam angle or other characteristic. In some embodiments, LED light source LED1 may have a 36V rating, while LED light sources LED2 and LED3 may each have a 72V rating.

Diode D1 may be any suitable diode having sufficient current carrying capability to provide a current path between LED light source LED2 and LED light source LED3.

Control switches Q1-Q4 may include any semiconductor devices suitable for receiving a digital switching signal from the microcontroller IC1 and providing enough power to drive current switches M2-M5. For example, control switches Q1-Q4 may be bipolar junction transistors, field effect transistors, or any other suitable switching devices.

Current switches M2-M5 may be any switching devices having sufficient current carrying capability to provide current paths among and around the LED light sources LED1, LED2, LED3 and for switching the LED light sources LED1, LED2, LED3 in different serial and parallel combinations. In at least one embodiment, current switches M2-M5 be P-channel power MOSFETs.

Current switch M1 may be any switching device capable of controlling the current through the circuit 100 under control of the microcontroller IC1. In some exemplary embodiments, current switch M1 may be an N-channel power MOS transistor.

Microcontroller IC1 receives power from power signals VDD and VSS and generally includes computer readable program code 115 stored on at least one computer readable medium for carrying out and executing the process steps described herein. The computer readable medium may be a memory 120 of the microcontroller IC1. In alternate aspects, the computer readable program code may be stored in a memory external to, or remote from, microcontroller IC1, and the memory 120 may include any media which is readable and executable by a computer. The microcontroller 115 may also include a processor 125 for executing the computer readable program code 115. In at least one aspect, the microcontroller IC1 may include one or more input or output devices, including sensing circuitry 130 for determining a voltage at inputs RC0 and RC1 and driver circuitry 135 for providing signals RC2-RC5 and RA5 to drive current switch M1 and control switches Q1-Q4.

Sensing circuitry 130 may include one or more A/D converters utilized to measure signal RC0 representative of the voltage from rectifier 105. The one or more A/D converters may also be utilized to measure the voltage of signal RC1 representing a current through circuit 100. The sensing circuitry 130 may also include one or more operational amplifiers to provide control signals 140 to driver circuitry 135 for controlling output RC2 which operates as a gate drive signal to M1. The microcontroller IC1 may operate the sensing circuitry 130 and the driver circuitry 135 to provide closed loop control of M1 and the current through circuit 100 under the control of program code 115, for example, operating M1 as a linear regulator. In some embodiments, the microcontroller IC1, under the control of program code 115, may operate the sensing circuitry 130 and the driver circuitry 135 to provide closed loop control of M1 and the current through circuit 100 based on the voltage from the rectifier 105 represented by signal RC0. As a result, the current through the circuit 100 may be controlled to provide one or more of a particular wave form, wave shape, or power factor.

Furthermore, the microcontroller IC1, under the control of program code 115, may operate the sensing circuitry 130 to measure signal RC0, representing the voltage from the rectifier 105, and selectively switch the LED light sources LED1, LED2, LED3 in and out of the circuit 100 in different combinations as the voltage from the rectifier 105 changes. Thus, at each different voltage level, a combination of the LED light sources LED1, LED2, LED3 corresponding to the voltage level are connected into circuit 100 in order to efficiently use the voltage to produce light. For example, as the voltage from the rectifier approaches 36V, LED light source LED1 having a 36V rating may be switched into circuit 100. As another example, as the voltage from the rectifier approaches 144V, LED light sources LED2 and LED3 each having a 72V rating may be switched into circuit 100 in series.

Figure 2:
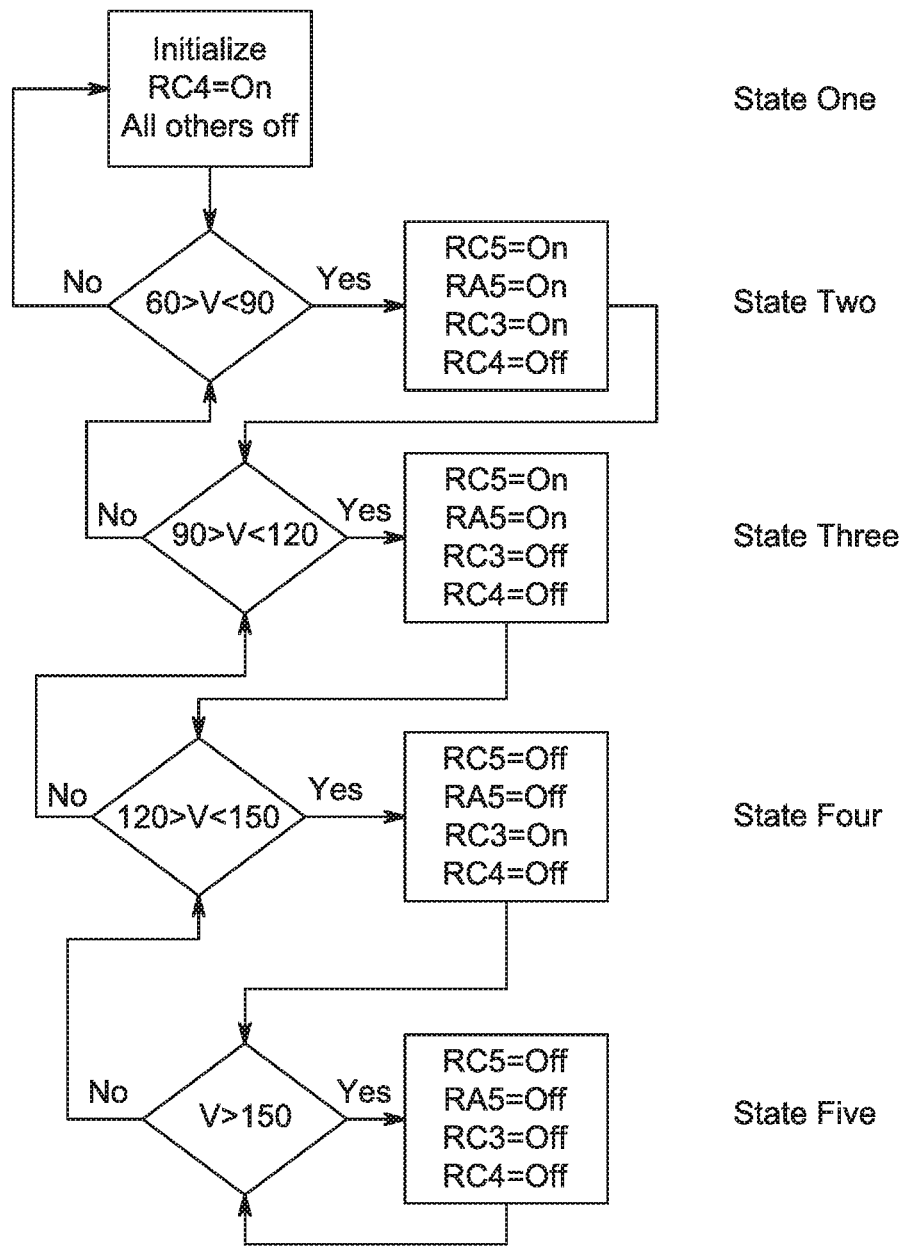
FIG. 2 shows different microcontroller operational states for selectively switching LED light sources.

Turning to FIG. 2, the microcontroller may operate in different exemplary states to selectively switch the LED light sources LED1, LED2, LED3 in and out of the circuit 100 in different combinations, resulting in different current flows through circuit 100 as shown in FIGS. 3-7. While the different states, State 1, State 2, State 3, State 4, and State 5 are described with respect to various voltage ranges, it should be understood that the voltage ranges are exemplary and non-limiting and that the disclosed embodiments may operate across any suitable voltage ranges. It should be noted that in the description of States 1-5, the voltage ratings of LED light sources LED1, LED2, LED3 of 36V, 72V, and 72V, respectively, are also exemplary and non-limiting. It should also be noted that in some embodiments, as the microcontroller IC1 operates through the different states, the microcontroller IC1 may continuously operate to control M1 and the current through circuit 100. By using the microcontroller IC1 to simultaneously control the LED light source configuration and the current flow, the circuit 100 may provide a range of efficient power usage and power factors.

The microcontroller IC1 operates to turn signals RC2-RC5 and RA5 on and off under control of program code 115. For purposes of the disclosed embodiments, an "on" signal is active and provides a driving voltage or current to the connected control or current switch. Correspondingly, an "off" signal is inactive and does not provide a driving voltage or current to the connected control switch or current switch.

Figure 3:
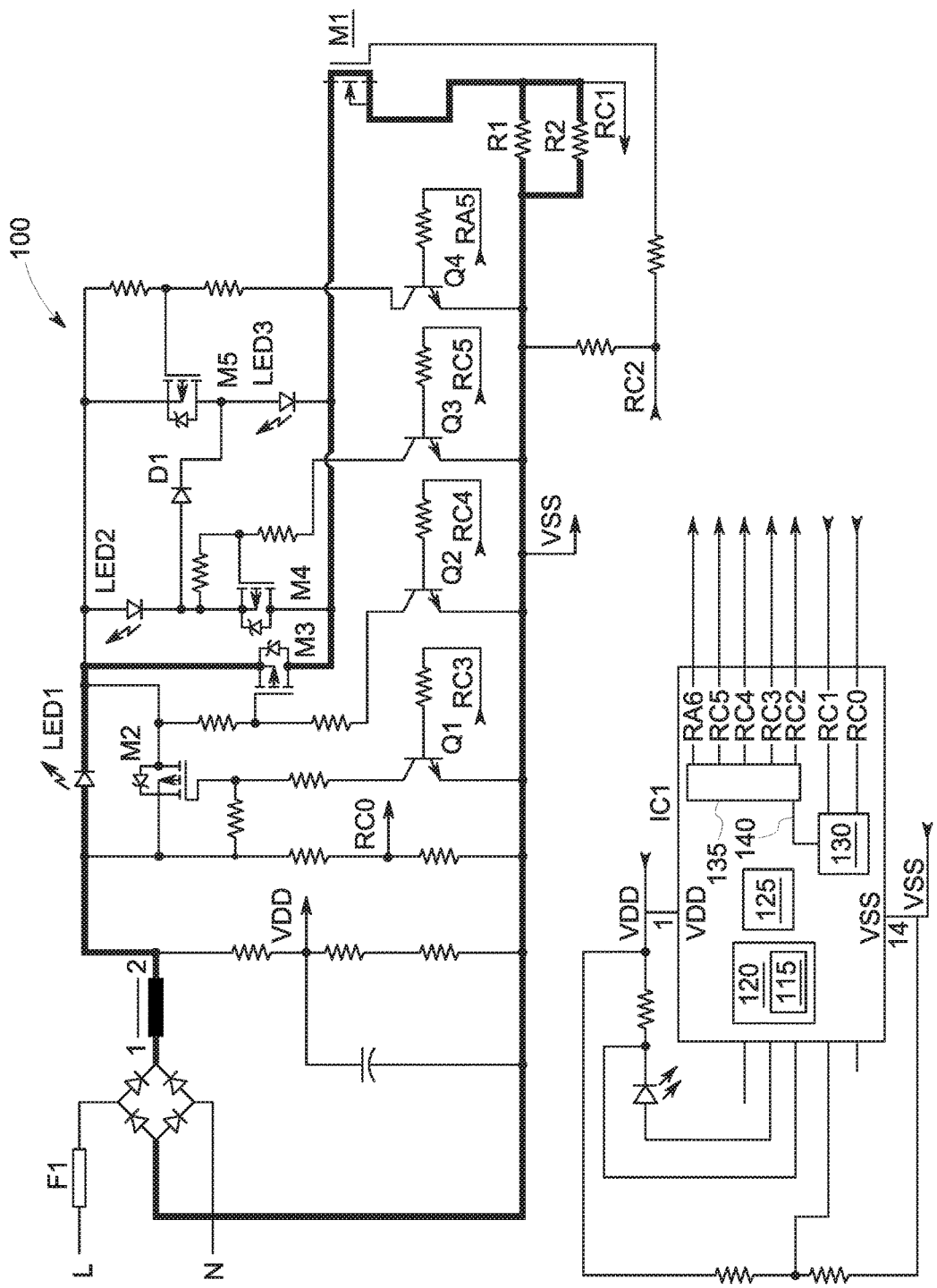
FIGS. 3-7 show different current paths resulting from different switch configurations according to the disclosed embodiments.
Figure 4:
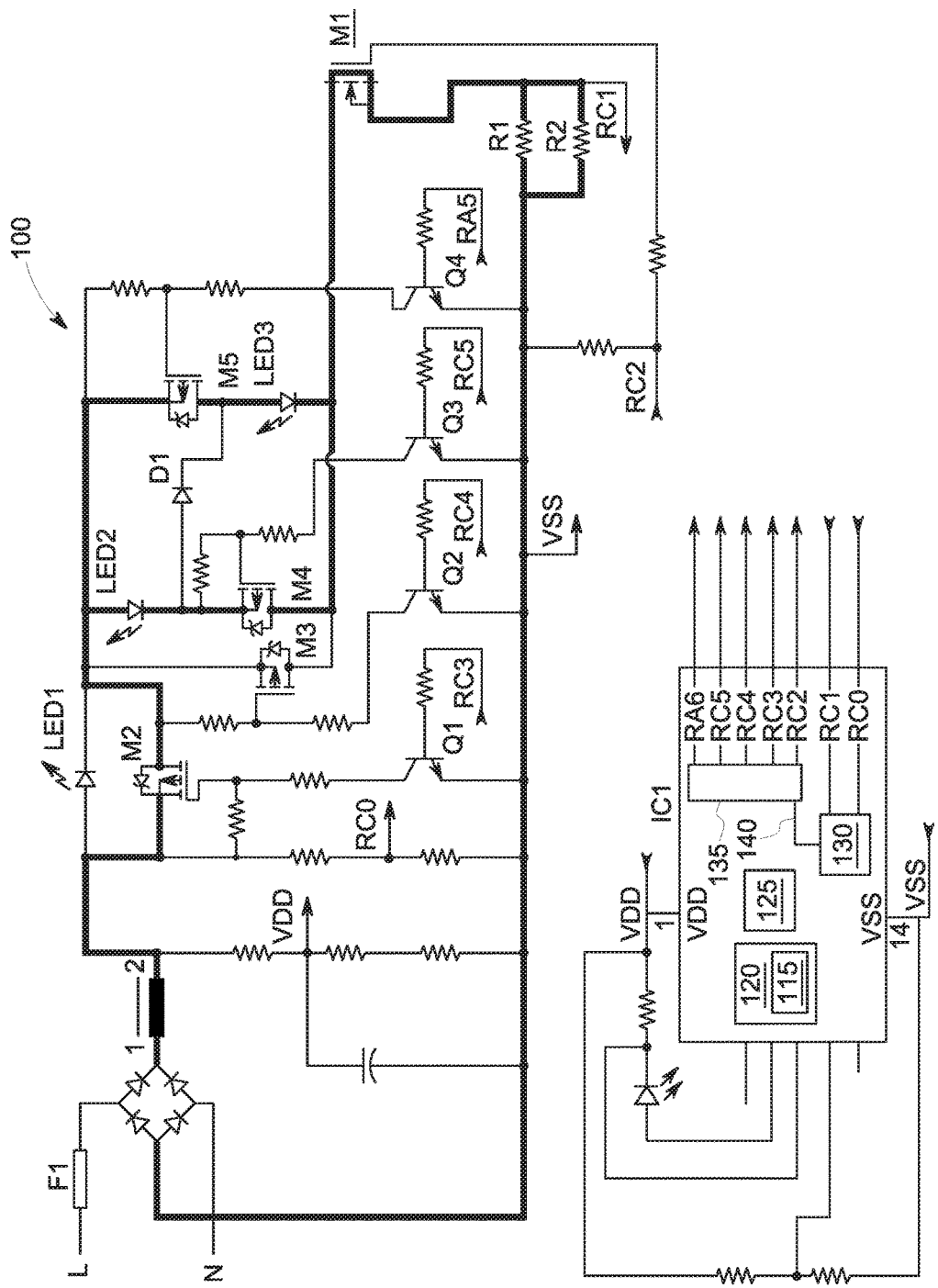

In State 1, as the voltage of signal RC0 increases from 0-60V, signal RC5 is off causing Q3 and M4 to be non-conducting, signal RA5 is off causing Q4 and M5 to be non-conducting, signal RC3 is off causing Q1 and M2 to be non-conducting, and signal RC4 is on, causing Q2 and M3 to be on and conducting, turning LED1 on, and bypassing or shorting LED2 and LED3. As a result, current flows from the positive side of the rectifier through LED1 and through M1, as shown in FIG. 3. In State 2, as the voltage increases from 60-90V, signal RC5 is on causing Q3 and M4 to be conducting and signal RA5 is on causing Q4 and M5 to be conducting, coupling LED2 and LED3 in parallel. Signal RC3 is on causing Q1 and M2 to be conducting and shorting LED1. Signal RC4 is off, causing Q2 and M3 to be off and non-conducting. As a result current flows from the positive side of the rectifier through LED2 and LED3 in parallel and through M1, as shown in FIG. 4.

Figure 5:
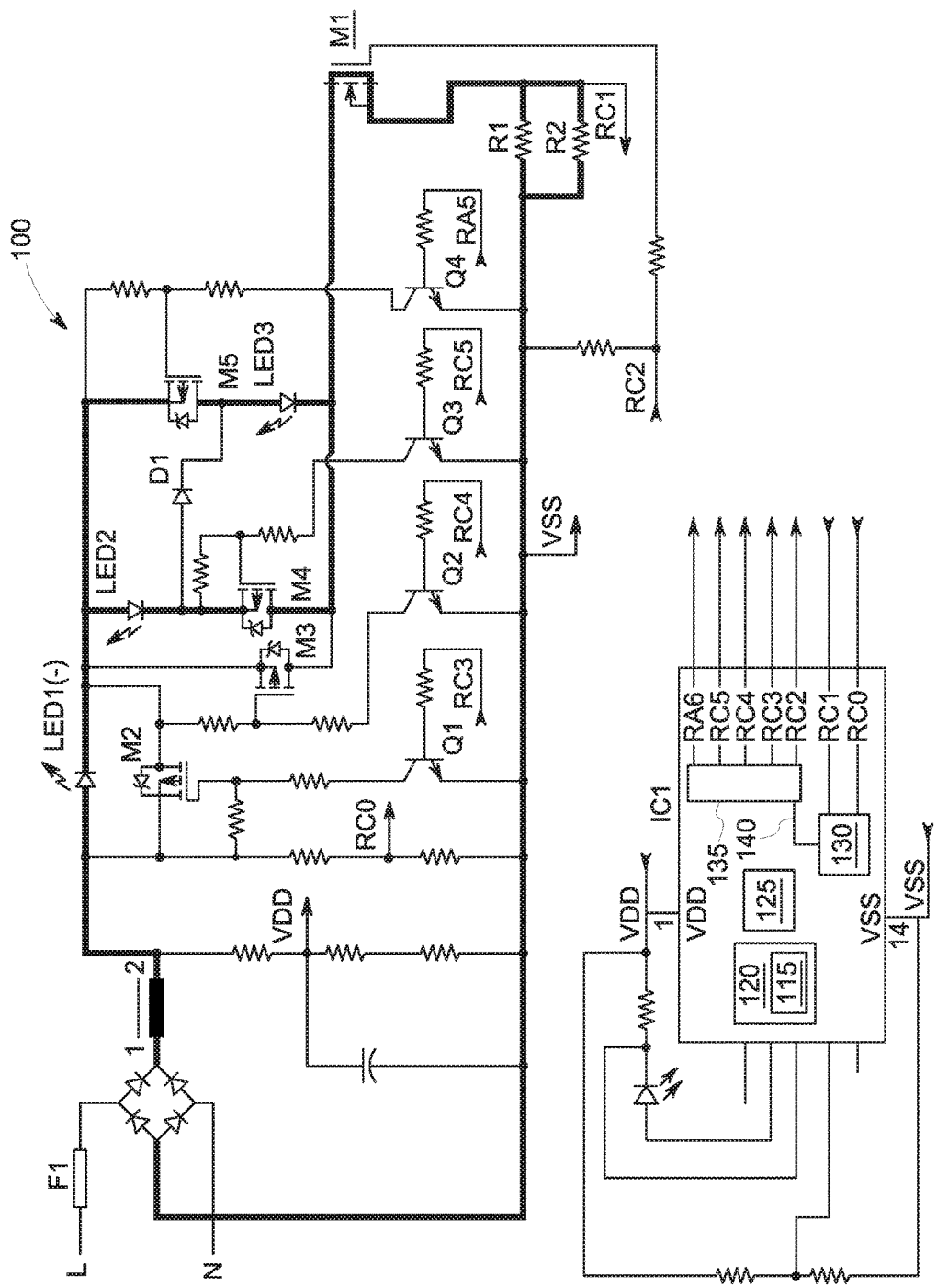

In State 3, as the voltage continues to increase from 90-120V, signal RC5 is on causing Q3 and M4 to be conducting and signal RA5 is on causing Q4 and M5 to be conducting, coupling LED2 and LED3 in parallel. Signal RC3 is off causing Q1 and M2 to be non-conducting and causing current to flow through LED1. Signal RC4 is off, causing Q2 and M3 to be off and non-conducting. As a result current flows from the positive side of the rectifier through LED1 and through LED2 and LED3 in parallel and through M1, as shown in FIG. 5.

Figure 6:
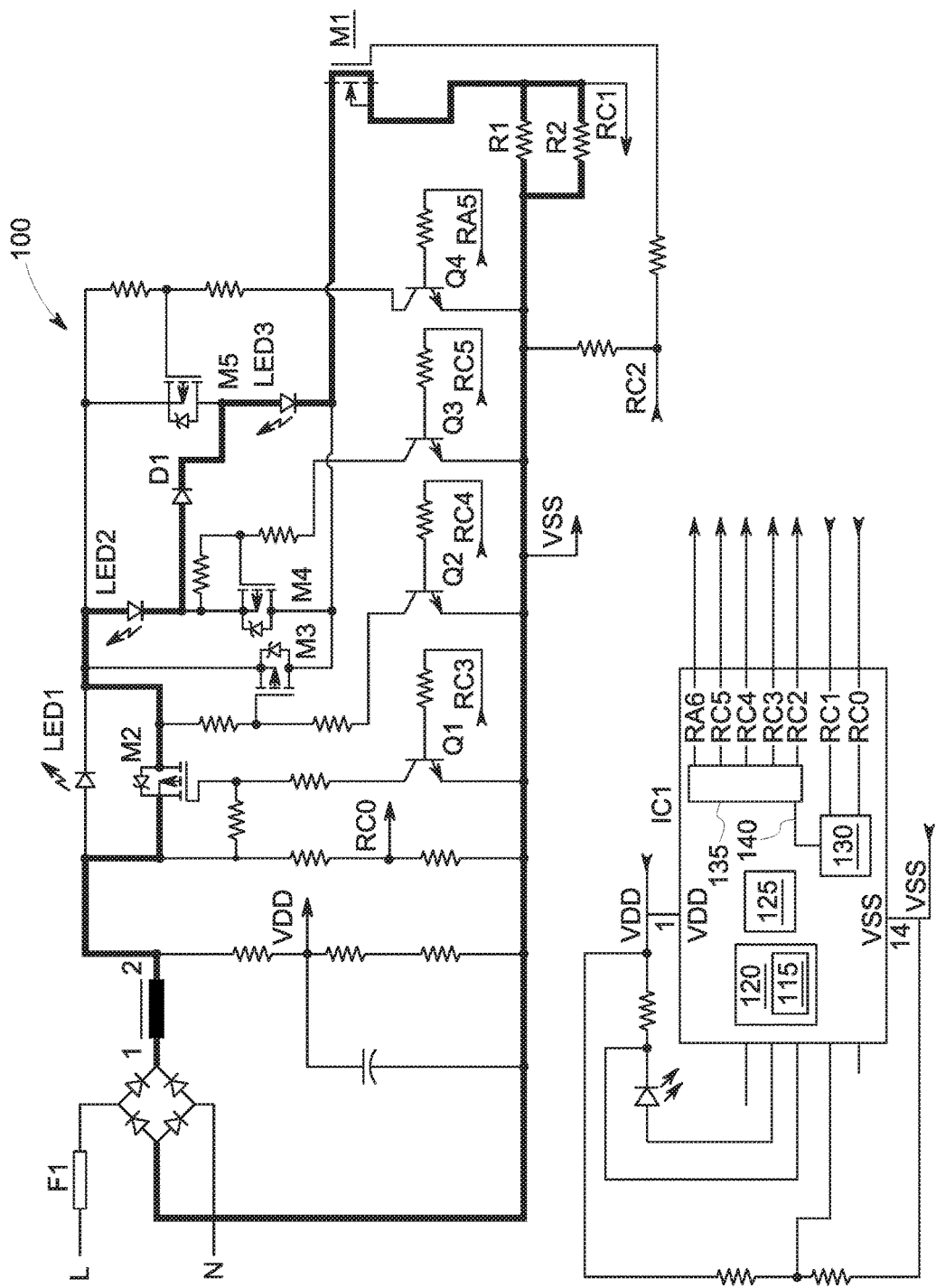

In State 4, as the voltage continues to increase from 120-150V, signal RC5 is off causing Q3 and M4 to be non-conducting and signal RA5 is off causing Q4 and M5 to be non-conducting, coupling LED2 and LED3 in series through diode D1. Signal RC3 is on causing Q1 and M2 to be conducting and causing current to flow around LED1. Signal RC4 is off, causing Q2 and M3 to be off and non-conducting. As a result current flows from the positive side of the rectifier through LED2 and LED3 in series and through M1, as shown in FIG. 6.

Figure 7:
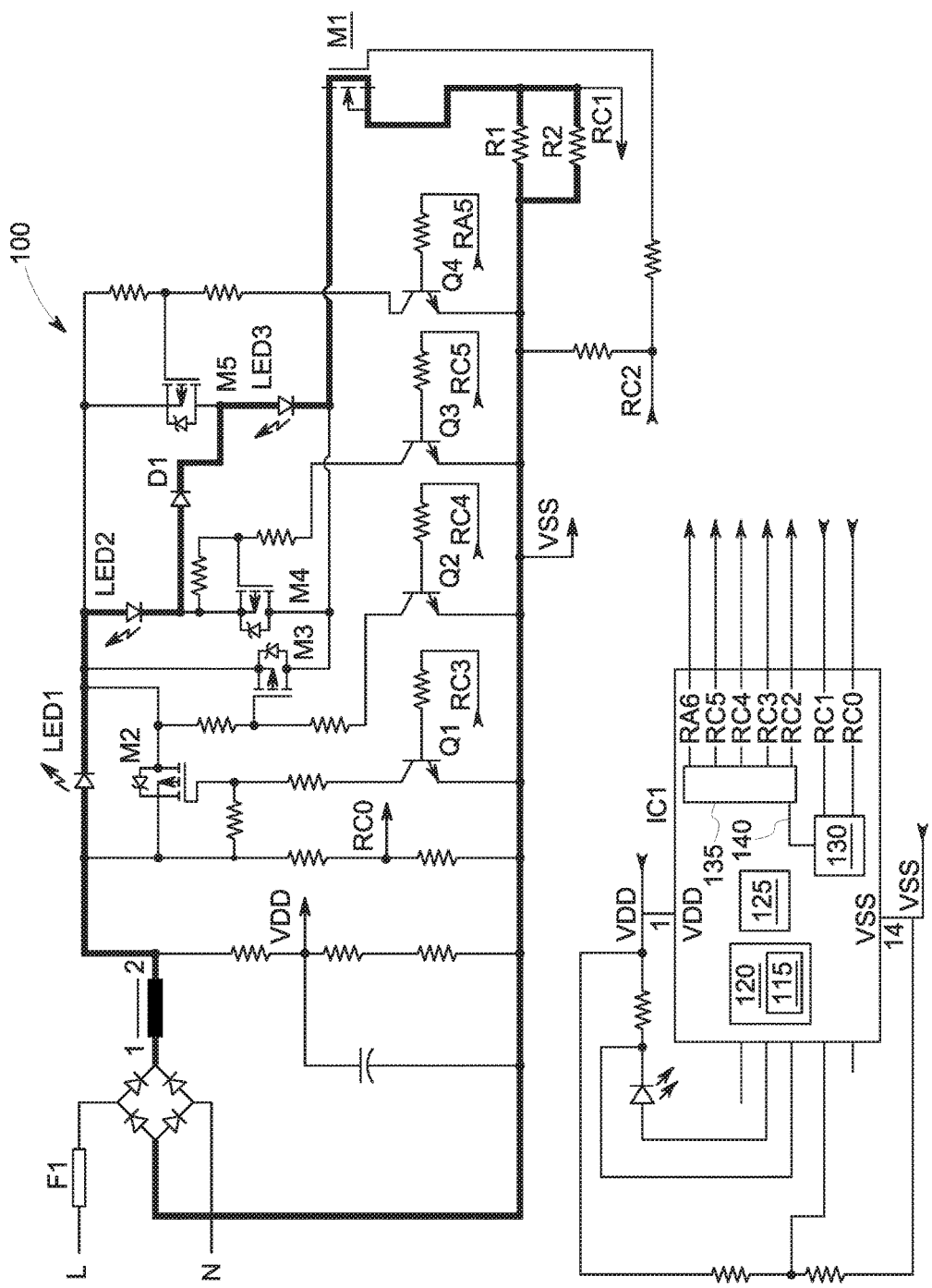

In State 5, as the voltage increases to over 150V, signal RC5 is off causing Q3 and M4 to be non-conducting and signal RA5 is off causing Q4 and M5 to be non-conducting, coupling LED2 and LED3 in series through diode D1. Signal RC3 is off causing Q1 and M2 to be non-conducting and causing current to flow through LED1. Signal RC4 is off, causing Q2 and M3 to be off and non-conducting. As a result current flows from the positive side of the rectifier through LED1, LED2 and LED3 in series and through M1, as shown in FIG. 7.

Thus, turning current switches M2-M5 on and off at various voltage levels may provide different efficiencies, and by controlling the current through circuit 100, a particular power factor may be achieved. By utilizing the microcontroller IC4, both of these functions may be optimized to achieve a desired power factor without more than desired efficiency losses.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. An LED device comprising
a rectifier configured to provide a rectified AC output;
sensing circuitry configured to measure the rectified AC output;
a plurality of LED light sources;
a plurality of current switches configured to selectively connect and selectively bypass individual ones of the plurality of LED light sources in one or more of a series and parallel combination across the rectified AC output;
a plurality of control switches configured to provide power to the current switches;
a linear regulator configured to control a current through the connected LED light sources; and
a controller configured to:
  operate the sensing circuitry to measure a voltage of the rectified AC output;
  selectively switch the plurality of control switches to achieve one or more of the series and parallel combinations of the LED light sources that results in a predetermined voltage across the connected LED light sources with respect to the sampled voltage and a predetermined ratio of the voltage across the connected LED light sources and the sampled voltage; and
  control the linear regulator to achieve a predetermined current through the connected LED light sources with respect to the sampled voltage.

2. The LED device of claim 1, wherein the controller is configured to control the linear regulator to achieve a predetermined ratio of the current through the connected LED light sources to the sampled voltage.

3. The LED device of claim 1, wherein the controller is configured to selectively switch the plurality of control switches to selectively connect and selectively bypass individual ones of the plurality of LED light sources in each of a plurality of series and parallel combinations for each of a plurality of sampled voltage ranges.

4. The LED device of claim 1, wherein the controller is configured to: identify at least one of a plurality of voltage ranges into which the sampled voltage falls; and switch the plurality of control switches to selectively connect and selectively bypass individual ones of the plurality of LED light sources in a particular series and parallel combination while the sampled voltage remains within the identified voltage range.

5. The LED device of claim 4, wherein the plurality of voltage ranges include approximately 0%-33%, 34%-50%, 51%-67%, 68%-84%, and 85%-100% of a peak voltage of the rectified AC waveform.

* * * * *